Dec. 25, 1962  J. L. D. MORRISON  3,069,999
HOT BEVERAGE DISPENSER
Original Filed Dec. 1, 1954  4 Sheets-Sheet 1

INVENTOR.
JAMES L. D. MORRISON
BY
ATTORNEYS.

Dec. 25, 1962
J. L. D. MORRISON
3,069,999
HOT BEVERAGE DISPENSER
Original Filed Dec. 1, 1954
4 Sheets-Sheet 2
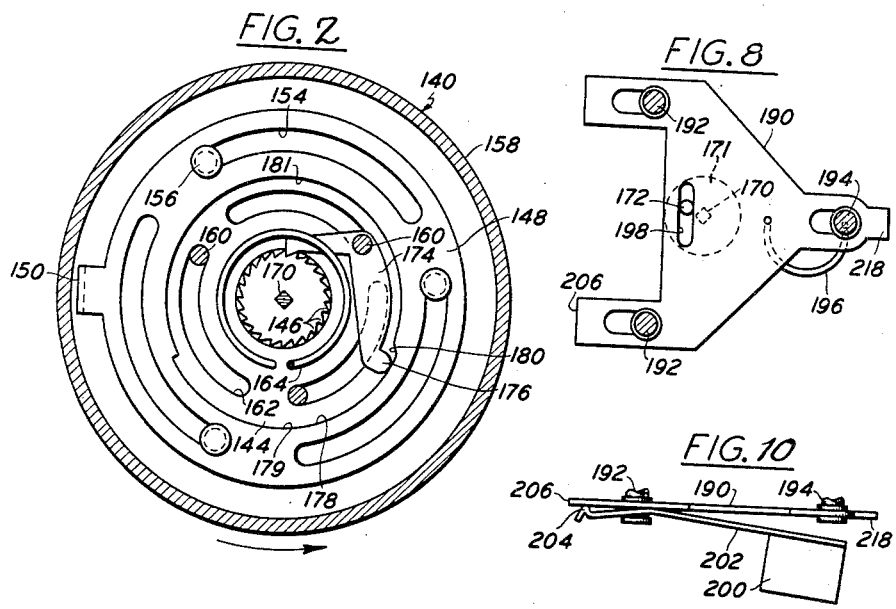
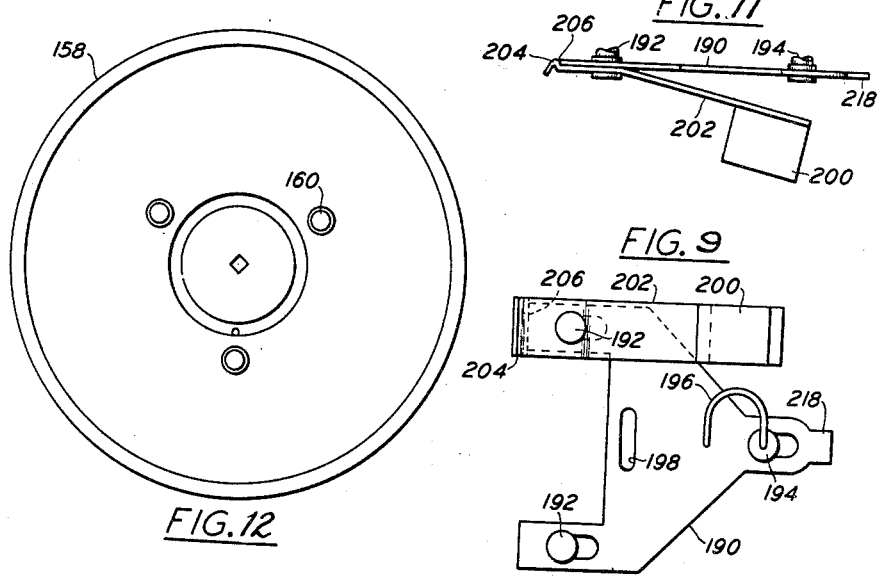
INVENTOR.
JAMES L. D. MORRISON
BY
ATTORNEYS.

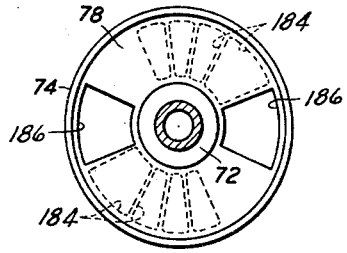
FIG. 4
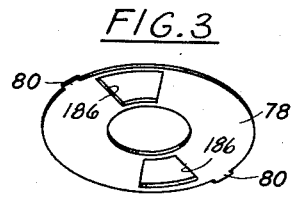
FIG. 3
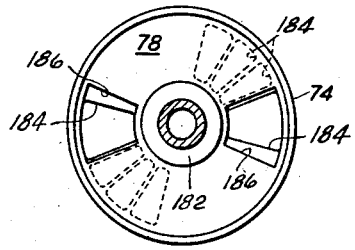
FIG. 5
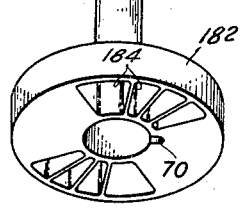
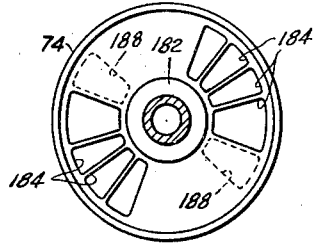
FIG. 6
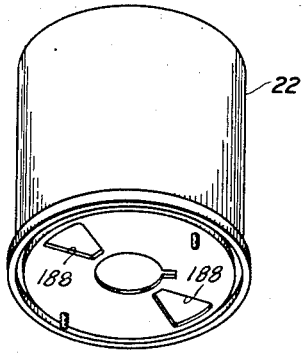
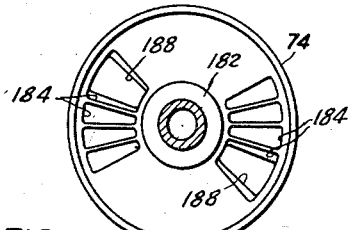
FIG. 7
INVENTOR.
JAMES L. D. MORRISON
BY
ATTORNEYS

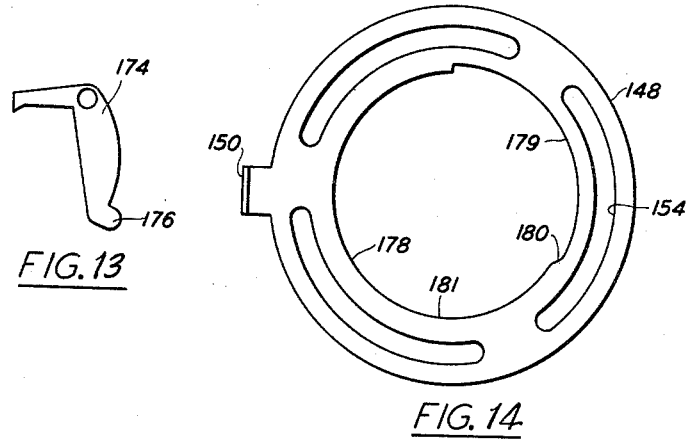
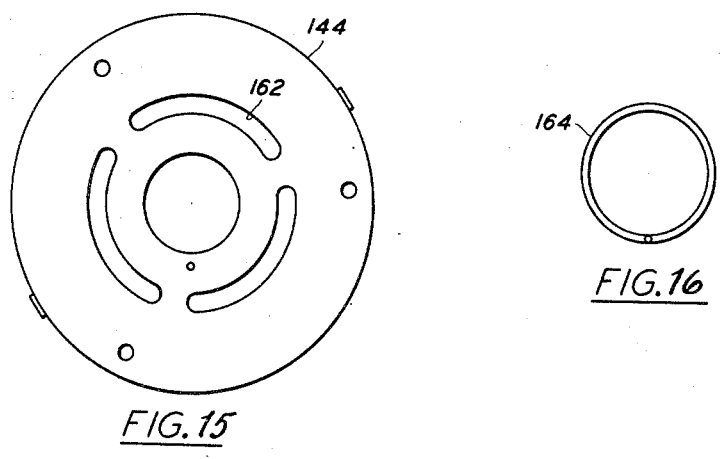

United States Patent Office 3,069,999
Patented Dec. 25, 1962

3,069,999
HOT BEVERAGE DISPENSER
James L. D. Morrison, 2045 Manderville Canyon Road, Los Angeles 49, Calif.
Original application Dec. 1, 1954, Ser. No. 472,442, now Patent No. 2,883,921, dated Apr. 28, 1959. Divided and this application Feb. 2, 1959, Ser. No. 790,426
8 Claims. (Cl. 99—279)

This is a divisional application of application Serial No. 472,442, filed December 1, 1954, now Patent No. 2,883,921 entitled "Hot Beverage Dispenser," which is a continuation-in-part of original Application Serial No. 464,112, filed October 22, 1954, now abandoned.

This invention relates generally to a hot beverage dispenser, and more particularly to a home appliance for automatically making and dispensing hot beverages in measured quantites.

The principal deficiency of devices for automatically dispensing hot beverages has been their bulkiness and complexity. Many of these devices require extensive servicing and are costly both to manufacture and operate. None of these devices with which I am acquainted would be feasible for home appliance application.

It is one of the prime objects of the invention to obtain for regular home usage a compact and low cost beverage dispenser which will function automatically to provide individual servings of hot beverage with the greatest possible convenience.

An additional object of the invention is that the appliance shall successively make and dispense, cup-by-cup, a freshly brewed beverage which is made just prior to its dispensing.

A further object of the invention is to obtain an appliance of the type described which is easily portable, simple to service and quick in operation.

From another standpoint, it is my objective to obtain a means whereby beverage ingredients can be sanitarily stored (in quantity) for relatively long periods of time within the appliance. Along with this objective, it is my further object to so store and operate the appliance that the stored ingredients will not be substantially affected by appliance operation.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Additional features of the invention will become apparent during the following description, wherein reference is made to the accompanying drawings, in which:

FIG. 2 is a sectional view taken substantially along section line 23 of FIG. 1;

FIG. 3 is a partial exploded view of the storage and metering mechanism of FIG. 1;

FIG. 4 is a top view of the assembled storage and metering mechanism with the cap assembly removed;

FIG. 5 shows the same view as FIG. 4 but with the metering cylinder rotated slightly;

FIG. 6 is the same view as FIG. 5 but with the top plate completely removed;

FIG. 7 shows the metering cylinder rotated slightly further from its position in FIG. 6 so that the apertures therein align with apertures in the bottom of the storage cup;

FIG. 8 is a top plan view of the slide plate of the metering mechanism of FIG. 1;

FIG. 9 is a bottom view of the float and slide plate assembly;

FIGS. 10 and 11 are side views of two different operating positions of the float and slide plate assembly, respectively;

FIG. 12 is a plan view of the actuating cover of the storage and metering mechanism of FIG. 1;

FIG. 13 illustrates the pawl shown in the mechanism of FIG. 2;

FIGS. 14 and 15 are plan views of the metering ring and top plate of the storage and metering mechanism of FIG. 1; and FIG. 16 is a separate view of the cover spring used in the storage and metering mechanism of FIG. 1.

Figure 1:
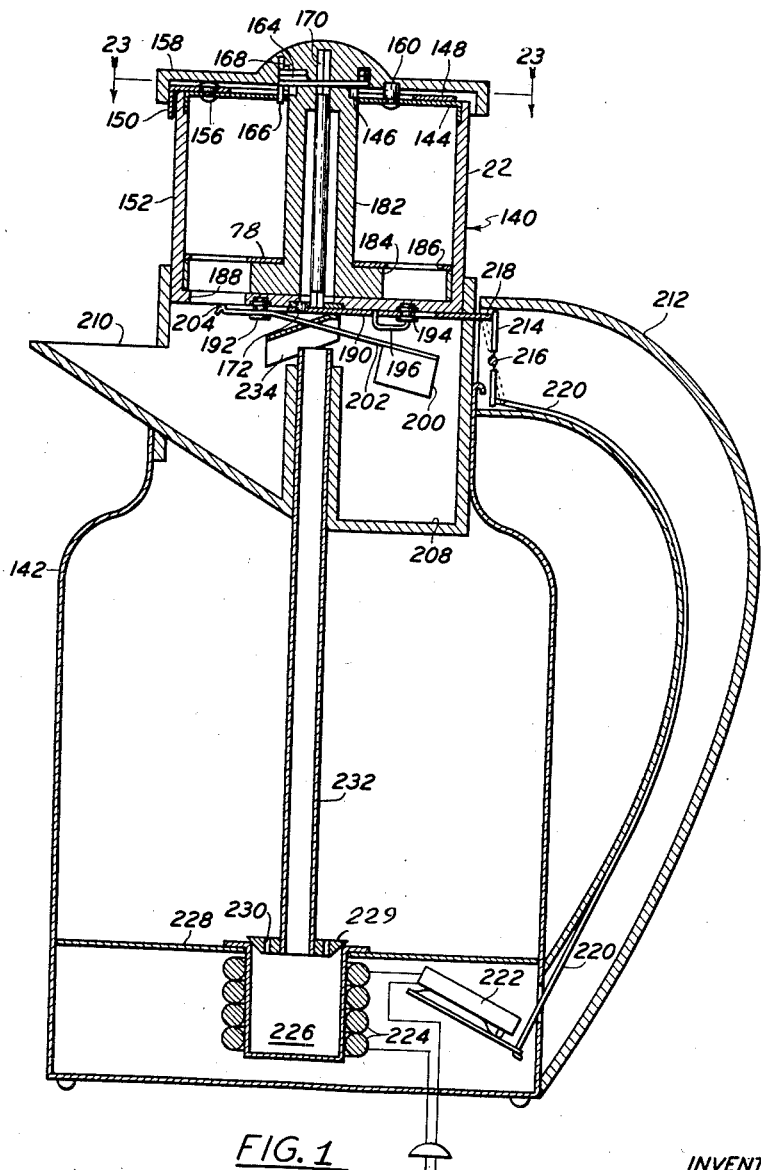
FIG. 1 is a sectional illustration of an embodiment of this invention.

An alternative design and method to the one disclosed and claimed in my parent Patent 2,883,921 comprises a heat-pump type of coffeemaker which delivers hot water in the desired quantity to a mixing chamber. A coffee powder-metering mechanism supplies a measured quantity of instant coffee powder beverage ingredient to the mixing chamber whereupon the mixture is ready for dispensing. One type of coffee powder contemplated by this invention is the so-called instant type which is capable of being dissolved almost instantly in hot water. One primary difference between this alternative design and the one disclosed and claimed in my aforementioned patent is that mixing of the coffee powder or beverage ingredient occurs after the water is heated, whereas my patented design comprehends mixing prior to heating.

Mounted on the upper end of the appliance as illustrated in FIG. 1 is a storage cup 22 for a beverage ingredient (instant coffee, tea and the like) having a metering device operatively disposed therein. This metering device includes a metering cylinder 182 which functions to discharge a preferred amount of the beverage ingredient from the storage cup 22 into the mixing chamber 208 (FIG. 1).

The storage cup 22 (FIG. 3) has openings 188 at the bottom thereof which communicate with the mixing chamber 208 (FIG. 1). Metering cylinder 182 is snugly fitted into the cup 22 and is turnable therein as will be explained in more detail hereinafter. Top plate 78 having nibs 80 (see FIG. 3) is then fitted over the top of the metering cylinder 182. The nibs 80 are received in slots formed in the inner wall of the cup 22 to prevent turning of the top plate 78 with the metering cylinder 182.

The top plate 78 closes graduated apertures 184 in the metering cylinder 182 when the operating mechanism is in a neutral or "off" position as shown in FIG. 4. When the metering cylinder 182 is turned sufficiently, two diametral apertures 184 are brought into alignment with apertures 186 in the top plate 78. Beverage ingredient, which may be in the form of powdered instant coffee, in cup 22 on top of plate 78 then fills the aligned apertures 184 in the metering cylinder 182 when they are positioned as indicated in FIG. 18. The relative position of the metering cylinder 182 and the cup 22 at this stage is then indicated in FIG. 6 wherein top plate 78 is removed for clarity. Further movement of the metering cylinder 182 aligns apertures 184 with openings 188 in the bottom of the cup 22, which empty into the mixing chamber 208 (FIG. 1). As the metering cylinder apertures 184 and openings 188 are brought into alignment, beverage ingredient drops into the mixing chamber 208.

The amount of beverage ingredient which is introduced to the chamber 208 depends upon the extent of turning of the metering cylinder 182, which is governed as will be explained in more detail hereinafter.

In FIG. 1, the reference numeral 140 indicates the combination of the measuring cup 22, the metering cylinder 182 and its associated mechanism.

Referring to FIG. 1 in particular, the mechanism 140 seats in the upper end of a reservoir or pot 142 and carries a top plate or closure 144 which is specifically shown in plan view in FIG. 15. The metering cylinder 182 is mounted for rotation inside the top plate 144 and has its upper end provided with ratchet teeth 146 (FIG. 2).

Superposed on the cover plate 144 is a metering ring 148 which is shown in detail in FIG. 14. This ring 148 has a depending flange 150 on its outer periphery which is disposed adjacent the outer periphery of the measuring container 152. This ring 148 is provided with three circumferentially arranged arcuate slots 154 which slidably receive suitable studs or rivets 156 fixedly secured to the top plate 144. The ring 148 may thereby be circumferentially moved with respect to the top plate 144.

Superposed on the ring 148 is an actuating cover 158 which carries three circumferentially arranged studs 160 for slidable reception by three circumferentially arranged arcuate slots 162 in the top plate 144. This cover 158 is thereby movable circumferentially with respect to both the top plate 144 and the metering ring 148. A coiled spring 164 has oppositely extending ends 166 and 168 which fit into companion notches or openings in the top plate 144 and cover 158, respectively. This spring is preformed to urge the cover 158 clockwise with respect to the stationary top plate 144 (see FIG. 2). An actuating shaft 170 having a square tip for being keyed to the cover 158 depends coaxially through the measuring mechanism 140 and is provided at its lower end with an eccentric pin 172 carried by a disc 171 on the lower end of shaft 170. Thus, rotation of the cover 158 will cause corresponding movement of the eccentric pin 172.

A pawl 174 (FIG. 13) is pivotably mounted on one of the rivets 160 for cooperative engagement with the metering cylinder ratchet teeth 146. This pawl is crank-shaped with the actuating arm 176 being slidably engageable with the inner periphery 178 of the metering ring 148. As will be seen more clearly in FIG. 14, this inner periphery 178 is formed with two different curvatures 179 and 181 joined by a cam surface 180 which serves in moving the pawl 174 into or out of engagement with the ratchet teeth 146 as will be explained more fully hereinafter.

The metering cylinder 182 is rotatably mounted on the center shaft 170 and is of substantially the same construction as the metering cylinder in my Patent 2,803,921. Thus, measured amounts of ingredient contained in the storage cup 152 may be discharged by the mechanism through the opening 188 as determined by the degree of rotation of the metering cylinder 182, as has been previously explained.

Slidably mounted on the bottom of the storage cup 152 is a slide plate 190 which is shown in plan view in FIG. 8. Suitable rivets 192 and 194 passing through elongated slots in the slide plate 190 are fastened by some suitable means to the bottom of the cup 152, whereupon the plate 190 may be reciprocated a distance depending upon the length of these slots. A suitable preformed return spring 196 is connected between the slide plate 190 and the cup 152 or some other stationary part of the mechanism for biasing the slide plate toward the left as viewed in FIGS. 1 and 8.

The eccentric pin 172 on the center shaft 170 projects through a transverse slot 198 in the slide plate 190 and serves to reciprocate the slide plate when the center shaft 170 is rotated.

One of the rivets 192 secured to the underside of the cup 152 loosely carries for swinging movement a buoyant float 200. This float, as shown more clearly in FIGS. 9, 10 and 11, is composed of a supporting arm 202 which is bent at a slight angle and which is provided with a hook 204 on one end. This hook 204 is engageable with the rear transverse edge 206 of the slide plate 190. Thus, when the slide plate is moved forwardly to an actuated position, the float 200 drops and the hook 204 rises to engage the rear edge 206, as illustrated in FIGS. 1 and 11. If the float is lifted to disengage the hook 204, the slide plate 190 may be slid rearwardly, as shown in FIG. 10. The float 200 is positioned inside a liquid container or mixing chamber 208 having a pouring spout 210.

Mounted in the handle 212 is a lever 214 pivoted intermediate its ends by means of a pin 216 carried by the handle 212. The upper arm of this lever 214 is operatively engageable by the forward end 218 of the slide plate 190. The lower arm is connected by means of an operating wire or link 220 to an electrical switch 222 of conventional design. This electrical switch is suitably connected in an electrical circuit for applying power to the usual heating coils 224 which surround a water heating chamber 226. A partition 228 separates this heating chamber 226 from the upper portion of the reservoir 142 and carries a suitable number of supply orifices 230 feeding into the heating chamber 226. These orifices 230 are preferably provided in a cover member 229 for the chamber 226, which is substantially coextensive with the partition 228 and may thereby be considered a part thereof. Thus, chamber 226 is supplied with water or other liquid at a suitable rate by means of orifices 230.

A coaxial supply tube 232 connects between the upper end of the chamber 226 and the upper portion of the mixing chamber 208, and serves to discharge heated water into the chamber 208. A suitable deflecting plate 234 is positioned immediately above the upper end of the tube 232 to deflect the heated liquid downwardly toward the bottom of the mixing chamber 208.

In operation, powdered coffee, for example, is present in the storage cup 152, and water in the reservoir 142. The metering ring 148 is circumferentially moved on the top plate 144 by means of the depending flange 150 to a desired position which determines the amount of powdered coffee which will be measured into the mixing chamber 208 by the metering cylinder 182. Friction between the ring 148 and its companion parts can serve to hold it in the desired position. Assuming a random position of the metering ring 148, the cover 158 is slowly rotated counterclockwise, whereby the pawl 174 engages the ratchet teeth 146 and rotates the metering cylinder 182 therewith. The pawl arm 176 rides on the inner periphery 178 of the stationary metering ring 148 and eventually rides over the cam surface 180. The sequence of cam movement is from the larger diameter ring surface 179 the cam surface 180 and onto the smaller diameter surface 181. When the pawl arm 176 moves onto the surface 181, it is swung counterclockwise, as viewed in FIGS. 2 and 13, whereby the pawl 174 is disengaged from the ratchet teeth 146. At this moment, the metering cylinder 182 is stopped from rotating even though rotation of the cover 158 may be continued. With this rotary movement of the cover 158, the eccentric 172 moves the slide plate 190 toward the right (FIG. 1) to swing the lever 214 clockwise for actuating the switch 222. Simultaneously, the float 200 drops to lock the slide plate 190 in this position. The heating coils 224 are energized and water in the chamber 226 is almost instantaneously raised to boiling. This boiling liquid levitates through the discharge tube 232 and into the mixing chamber 208 until this chamber fills to a point which raises float 200 sufficiently to disengage the hook 204 from the slide plate 190. When this happens, the return spring 196 as well as the cover spring 164 moves the slide plate 190 rearwardly (to the left), thereby moving the lever 214 counterclockwise for deactuating switch 222. The heating coils 224 are thereby turned off and no more water will be heated and transmitted to the mixing chamber 208. Water is supplied constantly to the chamber 226 through the orifices 230.

To assure retraction of plate 190 by the spring 196, the eccentric 172 is so designed as to never be in line (dead center) with guide pin 194 when the cover 158 is turned to its actuated position.

Since the powdered coffee was previously metered into the mixing chamber 208 by rotation of the cover 158, it will mix with the heated water, thereby completing a coffee-making operation.

The mixed coffee may thereafter be poured from the spout 210.

As in the case of the first embodiment herein described, this alternative design automatically provides a single cup of coffee upon manipulation of the actuating cover 158.

As will now be apparent from the preceding, the beverage ingredient may be of the instant type in either powder, liquid, or pellet form. The metering devices 72 and 140 would, of course, have to be sealed against leakage if a liquid ingredient were used. Furthermore, the ingredient and liquid may be mixed prior to heating or subsequent to heating, or the liquid can be heated and then mixed with the ingredient, as explained previously.

What is claimed is:

1. A beverage-making device comprising a liquid supply reservoir, means for heating at least a portion of the liquid in said reservoir, a mixing chamber, means communicating between said reservoir and said chamber for supplying heated liquid to the latter, a container for beverage ingredient, an ingredient-measuring mechanism for delivering a measured quantity of ingredient to said chamber, an operating member connected to said mechanism and including means for actuating said mechanism, switch means connected to energize said heating means, an actuating element movable between "on" and "off" positions, means connecting said switch means to said actuating element for operating said switch means to "on" and "off" positions in response to movement of said element to its "on" and "off" positions respectively, connecting means between said operating member and said actuating element for moving the latter from "off" to "on" positions, means urging said element to its "off" position, a control device in said chamber having a connection with said element for holding the latter in its "on" position, said control device including means movable in response to changes in the level of liquid supplied to said chamber to release said element for movement from the later's "on" to "off" positions in response to a predetermined quantity of liquid being supplied to said chamber, and means for disabling said control device when said element is in its "off" position.

2. A beverage-making device comprising a liquid supply reservoir, means for heating at least a portion of the liquid in said reservoir, a mixing chamber, means communicating between said reservoir and said chamber for supplying heated liquid to the latter, a container for beverage ingredient, an ingredient-measuring mechanism for delivering a measured quantity of ingredient to said chamber, an operating member connected to said mechanism and including means for actuating said mechanism, switch means connected to energize said heating means, an actuating element movable between "on" and "off" positions, means connecting said switch means to said actuating element for operating said switch means to "on" and "off" positions in response to movement of said element to its "on" and "off" positions respectively, connecting means between said operating member and said actuating element for moving the latter from "off" to "on" positions, means urging said element to its "off" position, a float in said chamber movable in response to changes in the level of liquid in said chamber, said float having a connection with said actuating element for holding the latter in "on" position, and means disabling the last-named connection when said float has been raised to a predetermined position in said chamber thereby permitting said element to be moved to its "off" position.

3. A beverage-making device comprising a liquid supply reservoir, means for heating at least a portion of the liquid in said reservoir, a mixing chamber, means communicating between said reservoir and said chamber for supplying heated liquid to the latter, a container for beverage ingredient, an ingredient-measuring mechanism for delivering a measured quantity of ingredient to said chamber, an operating member connected to said mechanism for actuating the latter, switch means connected to energize said heating means, an actuating element movable between "on" and "off" positions, means connecting said switch means to said actuating element for operating said switch means to "on" and "off" positions in response to movement of said element to its "on" and "off" positions respectively, a connection between said operating member and said actuating element for moving the latter from "off" to "on" positions, means urging said element to its "off" position, a float in said chamber movable in response to changes in the level of liquid in said chamber, said float having a connection with said actuating element for holding the latter in "on" position, means disabling the last-named connection when said float has been raised to a predetermined position in said chamber thereby permitting said element to be moved to its "off" position, and means holding said float in a predetermined raised position when said element is in its "off" position.

4. A beverage-making device comprising a liquid supply reservoir, means for heating at least a portion of the liquid in said reservoir, a mixing chamber, means communicating between said reservoir and said chamber for supplying heated liquid to the latter, a container for beverage ingredient, an ingredient-measuring mechanism for delivering a measured quantity of ingredient to said chamber, an operating member connected to said mechanism for actuating the latter, switch means connected to energize said heating means, an actuating element having opposite end portions, means mounting said element for endwise movement between "on" and "off" positions, means connecting said switch means to said actuating element for operating said switch means to "on" and "off" positions in response to movement of said element to its "on" and "off" positions respectively, a connection between said operating member and said actuating element for moving the latter from its "off" to "on" positions, means urging said element to its "off" position, a float in said chamber having an arm pivoted intermediate its ends about a pivot adjacent to said chamber, said arm having a hook on one end which is removably engageable with one end portion of said actuating element for holding the latter in "on" position, said float being vertically movable to swing said hook out of engagement with said end portion whereby said element may move to its "off" position, and means holding said float in a predetermined raised position when said element is in its "off" position.

5. A beverage-making device comprising a liquid supply reservoir, means for heating at least a portion of the liquid in said reservoir, a mixing chamber, means communicating between said reservoir and said chamber for supplying heated liquid to the latter, a container for beverage ingredient, an ingredient-measuring mechanism for delivering a measured quantity of ingredient to said chamber, an operating member connected to said mechanism for actuating the latter, switch means connected to energize said heating means, an actuating element having opposite end portions, means mounting said element for endwise movement between "on" and "off" positions, means connecting said switch means to said actuating element for operating said switch means to "on" and "off" positions in response to movement of said element to its "on" and "off" positions respectively, a connection between said operating member and said actuating element for moving the latter from its "off" to "on" positions, means urging said element to its "off" position, a float in said chamber having an arm pivoted intermediate its ends about a pivot adjacent to said chamber, said arm having a hook on one end which is removably engageable with one end portion of said actuating element for holding the latter in "on" position, said float being vertically movable to swing said hook out of engagement with said end portion whereby said element may move to its "off" position, said hook being engageable with one side of said element when the latter is in its "off" position to hold said float in a predetermined raised position.

6. A beverage-making device comprising a liquid supply reservoir, means for heating at least a portion of the liquid in said reservoir, a mixing chamber, means communicating between said reservoir and said chamber for supplying heated liquid to the latter, a container for beverage ingredient, an ingredient-measuring mechanism for delivering a measured quantity of ingredient to said chamber, an operating member connected to said mechanism for actuating the latter, switch means connected to energize said heating means, a support fixed with respect to said chamber, an actuating element having opposite end portions and mounted on said fixed support for endwise movement between "on" and "off" positions, said switch means being connected to said element for operating said switch means to "on" and "off" positions in response to movement of said element to its "on" and "off" positions respectively, a rotary connection between said operating member and said actuating element for moving the latter from its "off" to "on" positions, a spring connected between said fixed support and said actuating element for urging the latter to its "off" position, a float in said chamber having an arm pivoted intermediate its ends about a pivot post on said fixed support, said arm having a hook on one end which is removably engageable with one end portion of said actuating element for holding the latter in "on" position, said float being vertically movable to swing said hook out of engagement with said end portion whereby said element may move to its "off" position, said hook being engageable with one side of said element when the latter is in its "off" position to hold said float in a predetermined raised position.

7. A beverage-making device comprising a liquid supply reservoir, means for heating at least a portion of the liquid in said reservoir, a mixing chamber, means communicating between said reservoir and said chamber for supplying heated liquid to the latter, a container for beverage ingredient, an ingredient-measuring mechanism for delivering a measured quantity of ingredient to said chamber, an operating member connected to said mechanism for actuating the latter, switch means connected to energize said heating means, an actuating element movable between "on" and "off" positions, means connecting said switch means to said actuating element for operating said switch means to "on" and "off" positions in response to movement of said element to its "on" and "off" positions respectively, a connection between said operating member and said actuating element for moving the latter from "off" to "on" positions, means urging said element to one of its "off" and "on" positions, a float in said chamber movable in response to changes in the level of liquid in said chamber, means for holding said actuating element in "on" position, means disabling said last-named holding means when said float has been raised to a predetermined position in said chamber thereby permitting said element to be moved to its "off" position, and means holding said float in a predetermined position when said element is in its "off" position.

8. A beverage-making device comprising a liquid supply reservoir, means for heating at least a portion of the liquid in said reservoir, a mixing chamber, means communicating between said reservoir and said chamber for supplying heated liquid to the latter, a container for beverage ingredient, an ingredient-measuring mechanism for delivering a measured quantity of ingredient to said chamber, an operating member connected to said mechanism for actuating the latter, switch means connected to energize said heating means, an actuating element movable between "on" and "off" positions, means connecting said switch means to said actuating element for operating said switch means to "on" and "off" positions in response to movement of said element to its "on" and "off" positions, respectively, a connection between said operating member and said actuating element for moving the latter from "off" to "on" positions, means urging said element to one of its "off" and "on" positions, means for holding said actuating element in "on" position, means responsive to a predetermined liquid level in said mixing chamber for disabling said last-named holding means thereby permitting said element to be moved to its "off" position.

References Cited in the file of this patent
UNITED STATES PATENTS

| 1,063,188 | Simone | June 3, 1913 |
| 1,457,037 | Kreutz | May 29, 1923 |
| 1,470,584 | Kreutz | Oct. 9, 1923 |
| 2,158,133 | Lemp | May 16, 1939 |
| 2,252,614 | Bowen | Aug. 12, 1941 |
| 2,392,452 | Baumann | Jan. 8, 1946 |
| 2,569,820 | Locke | Oct. 2, 1951 |
| 2,597,063 | Catanzano | May 20, 1952 |
| 2,883,921 | Morrison | Apr. 28, 1959 |